US012782977B2

(12) United States Patent
Dean et al.

(10) Patent No.: US 12,782,977 B2
(45) Date of Patent: Nov. 3, 2026

(54) AIRCRAFT EMERGENCY DESCENT SYSTEM AND METHOD

(71) Applicant: Textron eAviation Inc., Providence, RI (US)

(72) Inventors: William Alexander Dean, Parkville, MD (US); Steven G. Hagerott, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 206 days.

(21) Appl. No.: 18/635,198

(22) Filed: Apr. 15, 2024

(65) Prior Publication Data

US 2024/0353867 A1 Oct. 24, 2024

Related U.S. Application Data

(60) Provisional application No. 63/496,868, filed on Apr. 18, 2023.

(51) Int. Cl.
*G05D 1/85* (2024.01)
*B64D 31/09* (2024.01)

(52) U.S. Cl.
CPC ............. *G05D 1/854* (2024.01); *B64D 31/09* (2024.01)

(58) Field of Classification Search
CPC ........ B64D 31/09; B64D 43/02; G05D 1/854; B64C 13/16; B64C 13/18; B64U 40/00; B64U 40/10
See application file for complete search history.

(56) References Cited

U.S. PATENT DOCUMENTS

| | | | | |
|---|---|---|---|---|
| 7,873,445 | B2 | 1/2011 | Schaeffer | |
| 9,567,091 | B2 | 2/2017 | Schaeffer et al. | |
| 10,046,853 | B2 | 8/2018 | Vander Mey | |
| 11,084,576 | B2 | 8/2021 | Caldwell | |
| 11,440,649 | B2 | 9/2022 | Stamps et al. | |
| 2008/0243313 | A1 * | 10/2008 | Schaeffer | B64C 29/0033 701/3 |
| 2020/0122827 | A1 | 4/2020 | Nemovi et al. | |
| 2024/0391600 | A1 * | 11/2024 | Schneider | B64C 27/006 |

* cited by examiner

*Primary Examiner* — Justin Michael Heston
(74) *Attorney, Agent, or Firm* — Avek IP, LLC

(57) ABSTRACT

An aircraft emergency descent method includes setting a pre-set maximum collective blade pitch and a pre-set altitude as part of a failure procedure; monitoring rotor assemblies through an aircraft control system and a failure detection module; determining when a rotor assembly has failed; and activating the failure procedure. The failure procedure includes commanding a maximum torque to a motor of each rotor assembly such that the rotational velocity of functioning rotors increases; detecting the increase in rotational velocity; adjusting either motor torque or a collective blade pitch to regulate rotational velocity; monitoring altitude of the aircraft; and upon determining when the aircraft reaches the pre-set altitude, adjusting the collective blade pitch to the pre-set maximum collective blade pitch via the at least one governor such that momentum is conserved, causing a descent rate of the aircraft to decrease as the aircraft approaches a ground surface.

19 Claims, 3 Drawing Sheets

AIRCRAFT EMERGENCY DESCENT SYSTEM AND METHOD

CROSS REFERENCE TO RELATED APPLICATIONS

Figure 1:
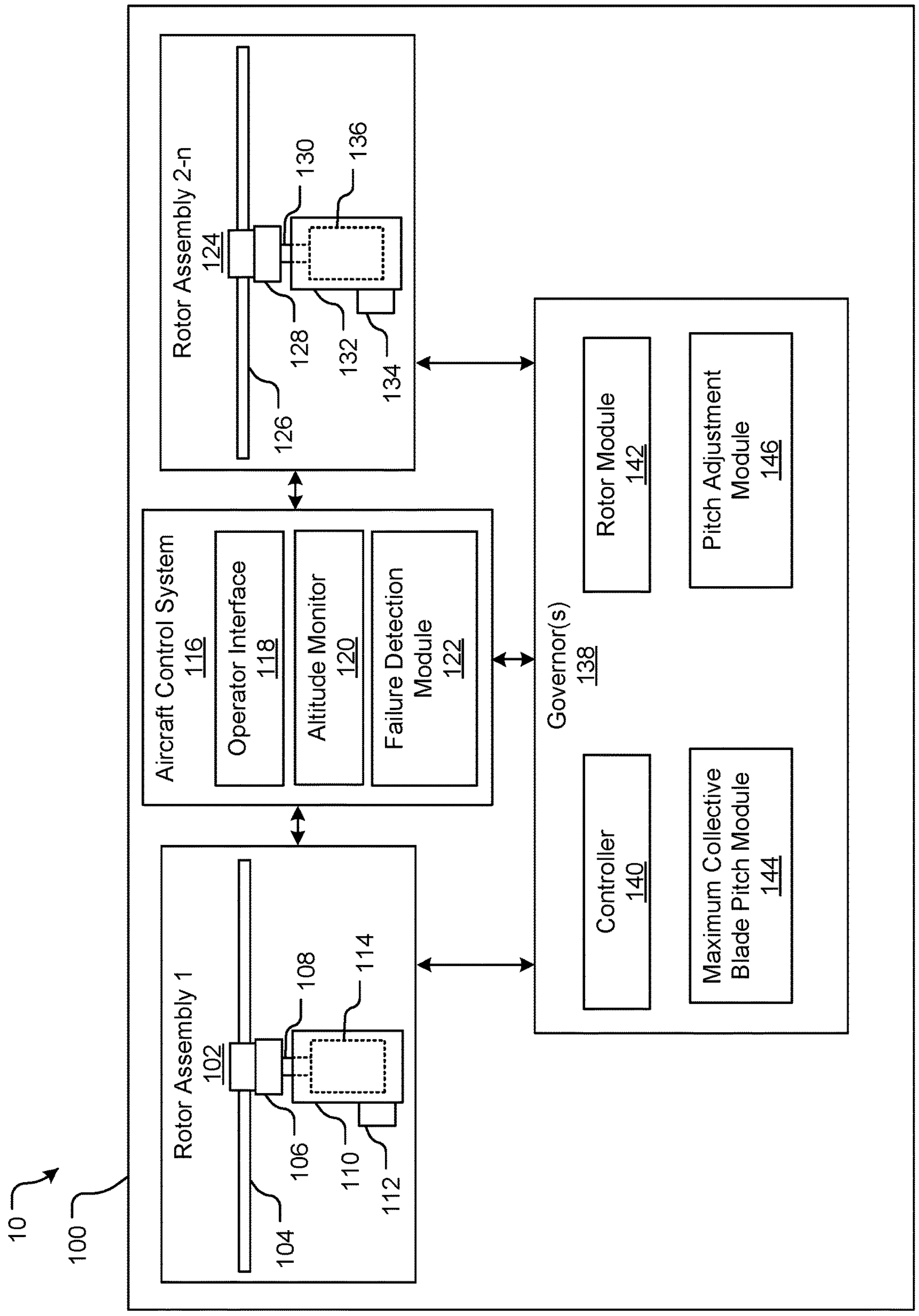

This application claims the benefit of priority of U.S. Provisional Patent Application No. 63/496,868, filed Apr. 18, 2023, the disclosure of which is herein incorporated by reference in its entirety.

BACKGROUND

1. Field

Embodiments of the disclosure relate to aircraft emergency descent procedures, and in particular, to an aircraft emergency descent system and method that utilizes one or more aircraft governors to adjust a collective blade pitch based on monitored aircraft parameters to reduce a descending rate of the aircraft.

2. Related Art

Aircraft operation systems conventionally utilize one or more emergency descent procedures to help ensure the safety of the aircraft and provide landing of the aircraft as safely as possible during a failure. For example, U.S. Pat. No. 9,567,091 to Schaeffer et al. describes a system and method for preserving rotor speed during a failure by comparing engine parameters to an engine limit and decreasing a collective pitch when the engine parameter is within a predefined range of the limit. U.S. Pat. No. 10,046,853 to Vander Mey describes a system that can be used to land a multi-rotor aircraft during an emergency, in which a flight control system is configured to control rotors to provide sufficient aircraft control to prevent catastrophic situations. U.S. Pat. No. 11,084,576 to Caldwell describes a system that can be used to land a multi-rotor aircraft during an emergency in which the use of a rotor auto-rotation feature may be used to slow the descent of the aircraft. U.S. Pat. No. 11,440,649 to Stamps et al. describes a system that includes a landing assistance turbine with a drive shaft to selectively provide rotational energy to the drive shaft during an underpowered descent to rotate the blade assembly and provide upward thrust. U.S. Patent Application Publication No. 20200122827 to Nemovi et al. describes a system that can be used to land a multi-rotor aircraft during an emergency, wherein an independent drive system utilizes functioning rotors to perform an emergency landing by yawing the aircraft around its center axis and balancing the aircraft in a constant circular rotation.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the present disclosure includes an aircraft emergency descent system. The system comprising an aircraft having a plurality of rotor assemblies, at least one governor in digital communication with each of the plurality of rotor assemblies, and an aircraft control system in digital communication with the plurality of rotor assemblies and the at least one governor. Each of the plurality of rotor assemblies includes a rotor coupled to a motor, and an actuator operable to adjust a blade pitch angle of the rotor. The at least one governor includes a rotor module configured to monitor rotational velocity of the rotor of each of the plurality of rotor assemblies, a pitch adjustment module configured to adjust a collective blade pitch of the rotor of each of the plurality of rotor assemblies, and a maximum collective blade pitch module having a pre-set maximum blade pitch. The aircraft control system includes an altitude monitor device configured to monitor an altitude of the aircraft, and a failure detection module configured to detect a failure associated with one or more of the rotor assemblies. When the failure is detected, the aircraft control system is first configured to command a maximum torque to the motor of each rotor assembly such that rotational velocity of one or more functioning rotors begins to increase. An increase in rotational velocity of the one or more functioning rotors is detected by the rotor module of the at least one governor, thereby causing the pitch adjustment module to adjust the collective blade pitch to attempt to maintain a pre-set desired rotational velocity. The altitude monitor device is configured to determine when the aircraft approaches a pre-set altitude, and when the aircraft is at the pre-set altitude, the maximum collective blade pitch module is activated with the pitch adjustment module to adjust the collective blade pitch to the pre-set maximum blade pitch, thereby slowing a rate of descent of the aircraft before the aircraft touches a ground surface.

According to another embodiment, the present disclosure relates to an aircraft emergency descent method. First, aircraft parameters are set as part of a failure procedure for an aircraft, the aircraft parameters include a pre-set maximum collective blade pitch for the aircraft and a pre-set altitude for the aircraft. Next, a plurality of rotor assemblies as part of the aircraft are monitored through an aircraft control system, the aircraft control system including a failure detection module. Then, determine when one or more of the plurality of rotor assemblies has failed via the failure detection module of the aircraft control system. The failure procedure is then activated upon determining that one or more of the plurality of rotor assemblies has failed. The failure procedure includes commanding a maximum torque to a motor of each of the plurality of rotor assemblies such that the maximum motor power increases rotational velocity of one or more functioning rotors of the plurality of rotor assemblies; detecting the increase in rotational velocity of functioning rotors via a rotor module of at least one governor; adjusting a collective blade pitch of the functioning rotors to regulate rotational velocity of the functioning rotors to attempt to maintain a pre-set desired rotational velocity; monitoring altitude of the aircraft to determine when the aircraft approaches the pre-set altitude; and upon determining when the aircraft reaches the pre-set altitude, adjusting the collective blade pitch to the pre-set maximum collective blade pitch via the at least one governor, thereby causing the rotational velocity of the functioning rotors to decrease and a descent rate of the aircraft to decrease as the aircraft approaches a ground surface.

BRIEF DESCRIPTION OF THE DRAWING FIGURES

Embodiments of the invention are described in detail below with reference to the attached drawing figures, wherein:

FIG. 1 depicts a schematic of an aircraft emergency descent system in accordance with the present invention.

Figures 2A, 2B, 2C:
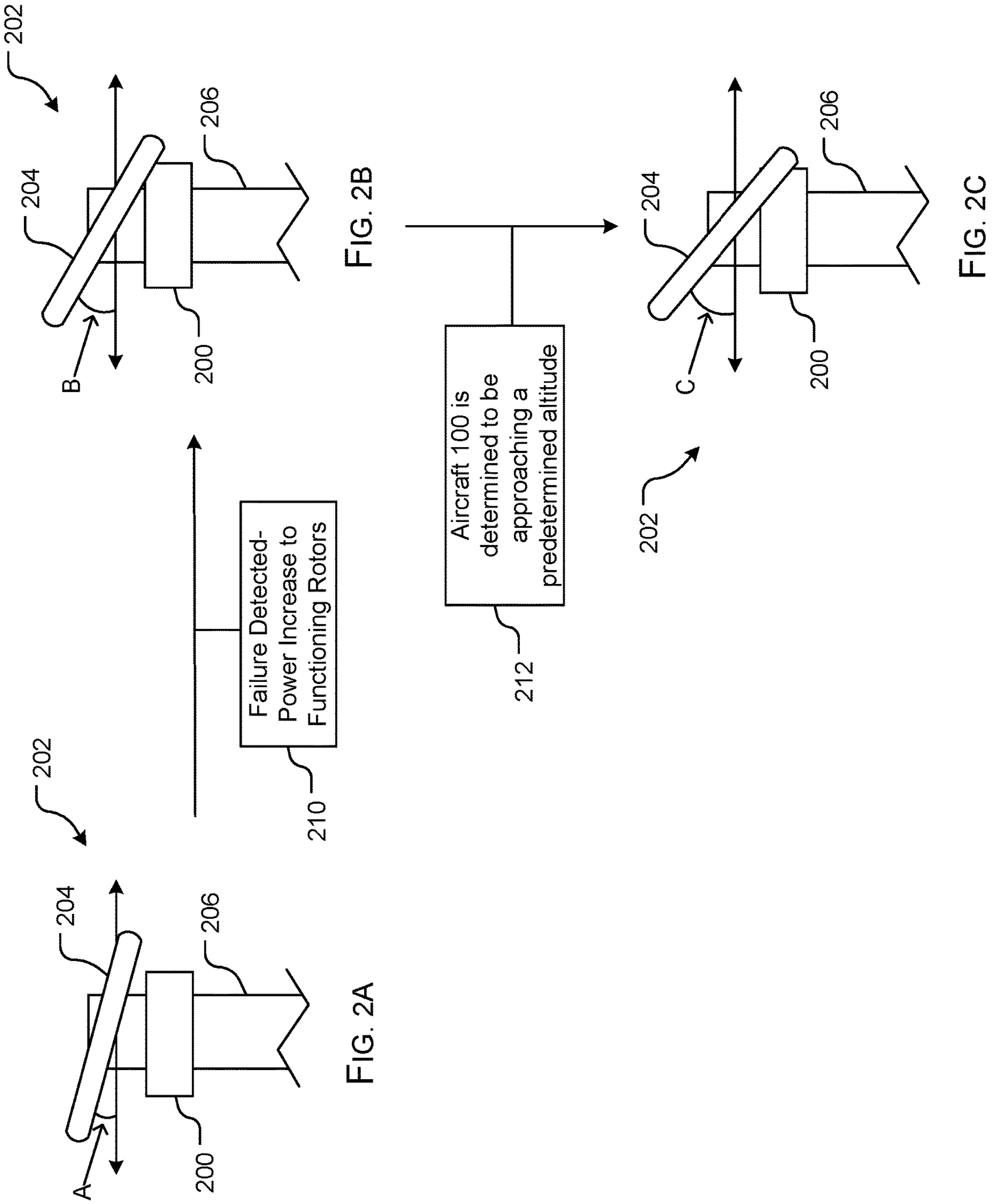

FIGS. 2A, 2B, and 2C illustrate the operation of a governor implementing an emergency descent method to control the rotational velocity of a rotor and slow a descending rate of an aircraft, in accordance with the present invention.

Figure 3:
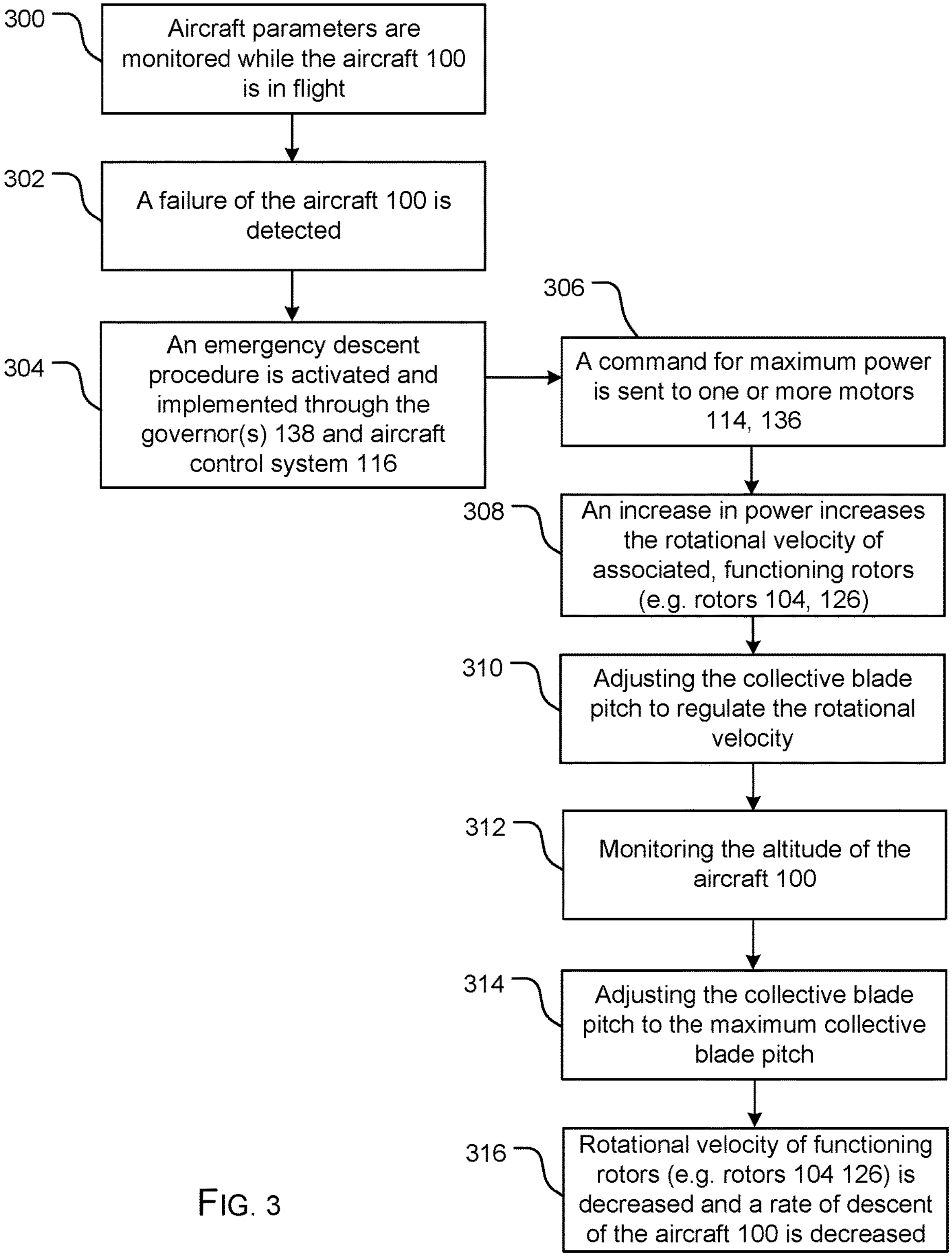

FIG. 3 is a flowchart of an emergency descent method implemented with the system of FIG. 1, in accordance with the present invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Safety is an important consideration in any aircraft system. In particular, having one or more emergency descent procedures is critical to ensure that the aircraft descends to the ground surface at a slow enough rate to prevent catastrophic damage. One common practice is conventionally referred to as an "Engine Out Maneuver", which is specifically useful for single-engine helicopters. Single engine helicopters generally have enough rotor inertia that, in the event of an engine failure, the aircraft can perform a nose-up flare maneuver, followed by an increase in collective blade pitch angle, to cushion touchdown. A larger rotor disk area and rotor inertia in helicopters improve this emergency descent procedure. Specifically, an aircraft's autorotation index correlates to this maneuver's effectiveness. A higher autorotation index generally increases the effectiveness, whereas a lower autorotation index generally decreases the effectiveness. Single engine helicopters generally have an autorotation index greater than 10 (e.g., about 20), whereas multicopters generally have an autorotation index of less than 10 (e.g. about 5), which greatly reduces the effectiveness of the conventional "Engine Out Maneuver" described above.

Another emergency descent method is described in detail in U.S. Pat. No. 9,567,091 to Schaffer et al., the disclosure of which is incorporated herein by reference in its entirety. This method utilizes an energy maximizer command. Specifically, during normal operation, the rotor speed is controlled by an engine, however, when the engine is at or near an operating limit, a controller sends the energy maximizer command to reduce collective pitch in order to maintain rotor speed, which preserves rotor lift. Again, this system is not optimal for a multicopter. Accordingly, there is motivation for developing a novel emergency descent system and method, which may be specifically tailored to multicopters, to improve safety during an aircraft failure.

The present invention provides for an aircraft emergency descent system and method, which is specifically beneficial for multicopters with low autorotation indexes. The system and method utilize one or more motor governors to aid in implementing an emergency descent procedure. Motor governors are mechanisms through which rotational velocity of rotors is maintained while the motor generates torque. One type of motor governor utilizes collective blade pitch angle to maintain rotational velocity and control thrust. This mechanism is described in detail in U.S. Pat. No. 7,873,445 to Schaeffer, the disclosure of which is incorporated herein by reference in its entirety. In summary, this type of governor operates by monitoring the rotational velocity of a rotor, and upon detection of an increase or decrease in the rotational velocity, the governor will adjust the collective blade pitch to either increase or decrease resistance and therefore increase or decrease an amount of thrust. The governor can be set to maintain the rotational velocity of the rotor within a set parameter, such as between upper and lower limits, or alternatively to maintain the rotational velocity to match a set point.

The present invention leverages the governor described above to implement a failure procedure, wherein the collective blade pitch angle is used to first maintain or attempt to maintain a rotational velocity of one or more rotors, and as an aircraft descends to and approaches a predetermined and pre-set altitude, the governor will adjust the collective blade pitch angle to a pre-set maximum, thereby maximizing resistance and decreasing a rate of descent. The pre-set altitude will be selected such that the rate of descent is lowest as the aircraft touches the ground surface, thereby minimizing the impact to the aircraft. This invention provides for an improved safety system, particularly for multicopters with low autorotation indexes.

In FIG. 1, a schematic depicts an aircraft emergency descent system 10 in accordance with the present invention. System 10 includes an aircraft 100 which is represented schematically by the exterior, rectangular box. The aircraft 100 will include any appropriate combination of features known in the art and may vary in design. In at least some embodiments, the aircraft 10 is a six-propeller electric vertical take-off and landing aircraft, however the present invention can be adapted and applied to various aircraft, although is specifically applicable in multirotor aircraft as opposed to single-rotor aircraft.

The aircraft 10 includes a plurality of rotor assemblies 102, 124, which again can include features and mechanical components known in the art such that the assemblies 102, 124 are fully functional. The assemblies 102, 124 are represented in a simplified schematic form for explanation purposes. Further, although only two assemblies 102, 124 are shown, the aircraft may include additional assemblies (i.e. a six rotor assembly aircraft) as would be understood by those skilled in the art.

Rotor assemblies 102, 124 include, among other things, rotors 104, 126, engaged with drive shafts 108, 130, which are further coupled with and operated via motors 114, 136. The motors 114, 136 will receive instructions to provide torque to the rotors 104, 126 via drive shafts 108, 130. The rotors 104, 126 will rotate to provide a thrust that lifts and propels the aircraft. The assemblies 102, 124 may further include nacelles 110, 132 for housing the motors 114, 136 and other operational components therein. In embodiments, the rotors 104, 126 can be adjusted in mast angle via actuators 112, 134 that may be configured to adjust the nacelles 110, 132 with respect to a body of the aircraft (not shown).

The collective blade pitch angle of the rotors 104, 126 is adjustable via collective pitch actuators 106, 128 which can receive commands from at least a governor 138. Commands and information are digitally transmitted between the governor 138 and actuators 106, 128 such as through wireless or wired connections. It is contemplated that multiple governors 138 may be used, such as one for each rotor assembly, or alternatively a single governor 138 may be used. As will be discussed below, the governor(s) 138 will adjust the collective blade pitch angle of the rotors 104, 126 through the collective pitch actuators 106, 128. Those skilled in the art will understand that the collective pitch angle of the rotors 104, 126 refers to the blade pitch of all of the blades of a respective rotor. It should further be appreciated that the representation of collective pitch actuators in the drawings is merely schematic and that any mechanism suitable for actuating the blades of the rotors 104, 126 for adjustment of the collective pitch angle is contemplated.

The present invention will utilize an aircraft control system 116. The aircraft control system 116 may include any appropriate digital and/or mechanical components, including hardware, software, one or more computers, one or more processors, wired or wireless connection mechanisms, user interfaces, etc., The control system 116 is in digital communication with the rotor assemblies 102, 124 and the governor(s) 138. The aircraft control system 116 will include at least an operator interface 118 for receiving user commands. The operator interface 118 will include any reasonable components, but at least one or more input devices that enable an operator to input flight and aircraft control commands for operation of the aircraft 100. For example, the interface 118 may include one or more sticks, switches, knobs, buttons, touchscreens, steering wheels, keypads, etc. The operator interface 118 may also include one or more display devices for providing the operator with information.

The interface 118, in embodiments, can particularly provide for mast control and thrust control, which allow for the operator to control flight of the aircraft. For example, the operator can set a mast angle as needed for vertical take off and horizontal flight. In addition, the operator can input higher or lower thrust for velocity of the aircraft.

The aircraft control system 116 will further include an altitude monitor device 120 which is configured to monitor an altitude of the aircraft 100 above a ground surface as would be understood by those skilled in the art. The altitude monitor device 120 can include pre-set parameters, including a predetermined and pre-set altitude for use during an emergency descent procedure, as discussed herein.

The aircraft control system 116 will also include a failure detection module 122 which is configured to monitor information received from various components of the aircraft 100 including at least from each rotor assembly 102, 124. For example, the failure detection module 122 may communicate with the motors 114, 136 to monitor and determine if a failure has occurred or is occurring. For example, the failure detection module 122 may detect when a rotor has slowed below a threshold limit or stopped, thereby indicating a likely failure. Upon determination that a failure has occurred, the failure detection module 122 will operate with other components to implement the failure procedure of the present invention. Although FIG. 1 represents the altitude monitor device 120 and failure detection module 122 as components of the aircraft control system 116, those skilled in the art will understand that these mechanisms may be separate and independent from the aircraft control system 116 or may be included with or in independent communication with governor(s) 138.

System 10 further includes the governor(s) 138 configured to operate with the rotor assemblies 102, 124 and the aircraft control system 116 to implement the failure procedure. The governor(s) 138 may further be used outside of failure conditions to regulate rotational velocity of the rotor assemblies 102, 124. The governor(s) 138 includes a controller 140 which can provide for communication with the aircraft control system 116 and rotor assemblies 102, 124 such that information can be transmitted between the components as necessary. Again, it should be understood that the governor(s) 138 may be incorporated into one or more devices and may use various hardware, software, computing devices, processors, communication mechanism, and control mechanisms in order to provide the functions described herein.

The governor(s) 138 further includes a rotor module 142 which is configured to monitor the rotational velocity of the rotors 104, 126. This provides the governor(s) 138 with information necessary to make adjustments based on preset parameters. For example, as previously discussed, when the aircraft 100 is not in failure mode, the governor(s) 138 is configured to monitor the rotational velocity of the rotors 104, 126 and maintain the rotational velocity of the rotors 104, 126 by adjusting the collective pitch angle. The governor(s) 138 includes a pitch adjustment module 146 configured to receive information related to the rotational velocity of the rotors 104, 126 and adjust the collective blade pitch angle of the rotors 104, 126 to regulate the rotational velocity of the rotors 104, 126. In the event of a failure, the governor(s) 138 use the pitch adjustment module 146 in combination with a maximum collective blade pitch module 144 to adjust the rotors 104, 126 to a maximum blade pitch based on a determination that the aircraft is approaching or at the predetermined altitude, thereby causing the rate of descent of the aircraft to decrease.

In other words, when a failure is detected, the aircraft control system 116 first commands a maximum torque to the motors 114, 136 which will increase the rotational velocity of functioning rotors 104, 126. This increase in rotational velocity is monitored by the rotor module 142 of the governor(s) which will cause the governor(s) 138 to first regulate the rotational velocity of the functioning rotor assemblies 102, 124 by adjusting the collective blade pitch to attempt to maintain a pre-set desired rotational velocity. Maintaining the rotational velocity may include attempting to keep the rotational velocity within a range or attempting to keep the rotational velocity at a set point. As the aircraft 100 approaches the pre-set altitude, as determined via the altitude monitor device 120, the governor(s) 138 will implement the maximum collective blade pitch module 144 to set the collective blade pitch angle to the pre-set maximum, thereby increasing resistance and slowing a rate of descent of the aircraft 100 before it touches the ground surface.

FIGS. 2A, 2B, and 2C depict the operation of the governor(s) 138 in combination with a collective pitch actuator 200 in regulating the rotational velocity of a rotor 202. The collective pitch actuator 200 and rotor 202, as well as a shaft 206, are shown in simplified schematic form and may be the actuators 106, 128, and/or rotors 104, 126, and/or shafts 108, 130 of FIG. 1. FIG. 2A demonstrates a starting point, wherein the blades, represented by blade 204, are providing a first amount of thrust and have a first collective blade pitch angle, as shown with angle A. When a failure is detected, through any means known in the art, a command is generated from the aircraft control system 116 to increase power to functioning rotors, as shown with box 210. The increase in power increases rotational velocity. The governor(s) 138 will then detect an increase in the rotational velocity of the rotor 202 and begin to regulate the rotational velocity by adjusting the collective blade pitch angle. As shown, since the rotational velocity begins to increase, the collective blade pitch angle is increased to angle B, thereby creating more resistance by the blades 204. This increase in resistance increases thrust and slows the descent rate of the aircraft. The altitude monitor device 120 monitors the aircraft 100 as it descends toward the ground surface. When the pre-set altitude for the failure descent procedure is approached or reached, as shown with box 212, the governor(s) 138 will adjust the collective blade pitch angle to the predetermined maximum pitch angle, represented by angle C in FIG. 2C. This creates more resistance and further causes the descent rate to slow as the aircraft 100 approaches the ground surface. Those skilled in the art will understand that the pre-set altitude and the pre-set maximum collective blade pitch may vary depending on the aircraft.

The emergency descent method is further depicted in a flowchart in FIG. 3. At step 300, the aircraft 100 is in flight, being operated by one or more operators, and various aircraft parameters are being monitored, such as for detection of an aircraft failure. At step 302, a failure is detected through monitoring the aircraft parameters. It is contemplated that the failure may be detected by determining that a motor has failed, a rotor has slowed below a threshold, or through any means appropriate. At step 304, now that a failure has been detected, the emergency descent procedure is activated and implemented through the governor(s) 138 and the aircraft control system 116.

Steps 306 through 316 demonstrate the emergency descent procedure. At step 306, a command for maximum motor power is conveyed to functioning motors. This command may be automatically generated or generated through user input. At step 308, because motor power has increased, the rotational velocity of associated functioning rotors begins to increase. At step 310, the governor(s) 138, through the rotor module 142, will recognize this increase in rotational velocity and begin adjusting the collective blade pitch angle to regulate the rotational velocity. At step 312, the aircraft 100 is monitored to determine when the aircraft 100 approaches and reaches the predetermined altitude. At step 314, when the aircraft approaches the predetermined altitude, the governor(s) 138 will adjust the collective blade pitch angle to the maximum collective blade pitch angle as previously set based on the specific aircraft. Lastly, at step 316, the rotational velocity of the functioning rotors 104, 126 is decreased and the rate of descent of the aircraft 100 is decreased. It will be appreciated that the maximum collective blade pitch and the pre-set altitude are both selected so that the aircraft will have the lowest rate of descent as it touches the ground surface. This functions to minimize the impact of the failure on the landing of the aircraft. Again, the predetermined altitude and maximum collective blade pitch may vary between models and types of aircraft.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An aircraft emergency descent system, comprising:

an aircraft having a plurality of rotor assemblies, each of the plurality of rotor assemblies having:

a rotor coupled to a motor; and an actuator operable to adjust a blade pitch angle of the rotor;

at least one governor in digital communication with the plurality of rotor assemblies, the at least one governor having:

a rotor module configured to monitor rotational velocity of the rotor of each of the plurality of rotor assemblies;

a pitch adjustment module configured to adjust a collective blade pitch of the rotor of each of the plurality of rotor assemblies; and a maximum collective blade pitch module having a pre-set maximum blade pitch;

an aircraft control system in digital communication with the plurality of rotor assemblies and the at least one governor, the aircraft control system having:

an altitude monitor device configured to monitor an altitude of the aircraft; and a failure detection module configured to detect a failure associated with one or more of the rotor assemblies;

a plurality of aircraft parameters pre-set as part of a failure procedure for the aircraft, the plurality of aircraft parameters including the pre-set maximum collective blade pitch and a pre-set altitude determinable via the altitude monitor device;

wherein when the failure is detected, the aircraft control system is first configured to command a maximum torque to the motor or maximum blade angle of each rotor assembly such that rotational velocity of one or more functioning rotor assemblies begins to either increase, hold, or decrease;

wherein an increase in rotational velocity is detected by the rotor module of the at least one governor, thereby causing the at least one governor to adjust motor torque or the collective blade pitch to regulate rotational velocity of the functioning rotors to attempt to maintain a pre-set desired rotational velocity that could be determined by a failure condition, a flight condition, or a height above ground; and wherein the altitude monitor device is configured to determine when the aircraft approaches the pre-set altitude; and wherein when the aircraft reaches the pre-set altitude and due to the aircraft reaching the pre-set altitude, the at least one governor is configured to adjust the collective blade pitch to the pre-set maximum blade pitch, causing the rotational velocity of the one or more functioning rotor assemblies to decrease and a descent rate of the aircraft to decrease as the aircraft approaches a ground surface.

2. The system of claim 1, wherein the plurality of rotor assemblies further comprises one or more rotor assemblies.

3. The system of claim 1, wherein the aircraft control system further comprises at least one operator interface for receiving user input for aircraft operation.

4. The system of claim 1, wherein the pre-set desired rotational velocity is a range of velocities.

5. The system of claim 1, wherein the pre-set desired rotational velocity is a set point rotational velocity.

6. The system of claim 1, wherein the at least one governor is configured to adjust the collective blade pitch of the rotor or motor torque of each of the plurality of rotor assemblies when in a failure mode and when not in a failure mode.

7. The system of claim 1, wherein the pre-set altitude is selected such that a reduced descent rate occurs at a point of touchdown of the aircraft to the ground.

8. The system of claim 1, wherein the aircraft comprises a multi-propeller electric vertical take-off and landing aircraft.

9. The system of claim 1, wherein the failure detection control module is configured to determine when one or more of the plurality of rotor assemblies has failed by determining when the rotor of one or more of the plurality of rotor assemblies has slowed in rotational velocity below a threshold level or when the rotor of one or more of the plurality of rotor assemblies has stopped rotating.

10. An aircraft emergency descent method, comprising:

setting aircraft parameters as part of a failure procedure for an aircraft, the aircraft parameters including a pre-set maximum collective blade pitch for the aircraft and a pre-set altitude for the aircraft;

monitoring a plurality of rotor assemblies as part of the aircraft through an aircraft control system, the aircraft control system including a failure detection module;

determining when one or more of the plurality of rotor assemblies has failed via the failure detection module of the aircraft control system;

activating the failure procedure upon determining that one or more of the plurality of rotor assemblies has failed, the failure procedure including:

commanding a maximum torque to a motor or maximum blade angle of each of the plurality of rotor assemblies such that the maximum torque either increases, holds, or decreases rotational velocity of one or more functioning rotor assemblies of the plurality of rotor assemblies;

detecting the increase in rotational velocity of the one or more functioning rotor assemblies via a rotor module of at least one governor;

adjusting a collective blade pitch or motor torque of the functioning rotors to regulate rotational velocity of the functioning rotors to attempt to maintain a pre-set desired rotational velocity that could be determined by a failure condition, a flight condition, or a height above ground;

monitoring altitude of the aircraft to determine when the aircraft approaches the pre-set altitude; and upon determining when the aircraft reaches the pre-set altitude, adjusting the collective blade pitch to the pre-set maximum collective blade pitch via the at least one governor, causing the rotational velocity of the one or more functioning rotor assemblies to decrease and a descent rate of the aircraft to decrease as the aircraft approaches a ground surface.

11. The method of claim 10, wherein the plurality of rotor assemblies further comprises one or more rotor assemblies.

12. The method of claim 10, further comprising receiving user input for aircraft operation through at least one operator interface as part of the aircraft control system.

13. The method of claim 10, wherein the pre-set desired rotational velocity is a range of velocities.

14. The method of claim 10, wherein the pre-set desired rotational velocity is a set point rotational velocity.

15. The method of claim 10, wherein the at least one governor is configured to adjust the collective blade pitch of the rotor or motor torque of each of the plurality of rotor assemblies when in a failure mode and when not in a failure mode.

16. The method of claim 10, wherein the pre-set altitude is selected such that a reduced descent rate occurs at a point of touchdown of the aircraft to the ground.

17. The method of claim 10, wherein the aircraft comprises a multi-propeller electric vertical take-off and landing aircraft.

18. The method of claim 10, wherein determining when one or more of the plurality of rotor assemblies has failed further comprises determining when the rotor of one or more of the plurality of rotor assemblies has slowed in rotational velocity below a threshold level or when the rotor of one or more of the plurality of rotor assemblies has stopped rotating.

19. The system of claim 1, wherein the pre-set altitude is defined as a trigger for adjustment of the collective blade pitch of the one or more functioning rotors to the pre-set maximum blade pitch.

* * * * *